(12) United States Patent
Katsurahira et al.

(10) Patent No.: US 7,474,300 B2
(45) Date of Patent: Jan. 6, 2009

(54) POSITION DETECTING APPARATUS AND POSITION POINTER

(75) Inventors: Yuji Katsurahira, Kazo (JP); Sadao Yamamoto, Kitakatsushika-gun (JP)

(73) Assignee: Wacom Co., Ltd., Saitama-Ken (JP)

( * ) Notice: Subject to any disclaimer, the term of this patent is extended or adjusted under 35 U.S.C. 154(b) by 623 days.

(21) Appl. No.: 10/986,457

(22) Filed: Nov. 12, 2004

(65) Prior Publication Data

US 2005/0128191 A1 Jun. 16, 2005

(30) Foreign Application Priority Data

Nov. 14, 2003 (JP) ............................... 2003-385760

(51) Int. Cl.
*G09G 5/00* (2006.01)
*G06F 3/041* (2006.01)

(52) U.S. Cl. ..................... 345/179; 345/173; 178/18.01; 178/18.03; 178/19.01; 178/19.03; 178/20.01

(58) Field of Classification Search ................. 345/156, 345/173, 174, 179; 178/18.01, 18.03–18.07, 178/19.01–19.03, 20.01–20.04, 19.06
See application file for complete search history.

(56) References Cited

U.S. PATENT DOCUMENTS

| | | | | |
|---|---|---|---|---|
| 4,948,926 A | * | 8/1990 | Murakami et al. | 178/18.07 |
| 5,028,745 A | * | 7/1991 | Yamanami et al. | 178/18.07 |
| 5,679,930 A | | 10/1997 | Katsurahira | |
| 5,898,136 A | * | 4/1999 | Katsurahira | 178/18.01 |
| 6,667,740 B2 | * | 12/2003 | Ely et al. | 345/179 |
| 7,176,907 B2 | * | 2/2007 | Chao et al. | 345/179 |
| 7,307,616 B2 | * | 12/2007 | Katsuhito et al. | 345/156 |
| 2003/0217871 A1 | * | 11/2003 | Chao et al. | 178/18.01 |
| 2004/0174343 A1 | * | 9/2004 | Chao et al. | 345/173 |

FOREIGN PATENT DOCUMENTS

| | | |
|---|---|---|
| JP | 63-070326 | 3/1988 |
| JP | 03-189716 | 8/1991 |
| JP | 03-189717 | 8/1991 |
| JP | 07-175572 | 7/1995 |
| JP | 07-219698 | 8/1995 |
| JP | 07-234752 | 9/1995 |
| JP | 07-239746 | 9/1995 |
| JP | 07-261909 | 10/1995 |
| JP | 10-133803 | 5/1998 |

* cited by examiner

*Primary Examiner*—Henry N Tran
(74) *Attorney, Agent, or Firm*—Berenato, White & Stavish

(57) ABSTRACT

In a position detecting apparatus, electric power of a position pointer is turned on only when the position pointer is put within a particular range from a tablet to minimize consumption of a battery disposed in the position pointer. When the position pointer is brought close to the tablet, a control signal transmitted from the tablet is detected by a resonant circuit of the position pointer, and MOSFETs serving as a power switch are turned on by the detected signal. In response, electric power is supplied from a battery via the MOSFETs to circuit elements of the position pointer, and thus an operation of the position pointer starts.

18 Claims, 4 Drawing Sheets

POSITION DETECTING APPARATUS AND POSITION POINTER

CROSS-REFERENCE TO RELATED APPLICATIONS AND CLAIM TO PRIORITY

This application claims priority under 35 U.S.C. § 119 to application number 2003-385760, filed Nov. 14, 2003 in Japan, the disclosure of which is incorporated herein by reference.

FIELD OF THE INVENTION

The present invention relates to an improved position detecting apparatus used to input position information, graphics information and/or text information into a computer, and also relates to an improved position pointer used in such a position detecting apparatus.

BACKGROUND OF THE INVENTION

It is known to use a position detecting system as an input device for a computer aided design system (CAD), a computer, or a portable telephone. These position detecting systems include a position detecting apparatus in which a signal is transmitted and received by means of electromagnetic coupling or electrostatic coupling between a position pointer and a tablet. A position pointed to by the position pointer is detected by the tablet based on the transmitted/received signal. Examples of such position detecting apparatuses may be found, for example, in patent documents listed below:

Patent Document 1: Japanese Unexamined Patent Application Publication No. 3-189716
Patent Document 2: Japanese Unexamined Patent Application Publication No. 7-175572
Patent Document 3: U.S. Pat. No. 5,679,930
Patent Document 4: Japanese Unexamined Patent Application Publication No. 3-189717
Patent Document 5: Japanese Unexamined Patent Application Publication No. 7-239746
Patent Document 6: Japanese Unexamined Patent Application Publication No. 7-219698
Patent Document 7: Japanese Unexamined Patent Application Publication No. 7-234752
Patent Document 8: Japanese Unexamined Patent Application Publication No. 7-261909
Patent Document 9: Japanese Unexamined Patent Application Publication No. 10-133803
Patent Document 10: Japanese Unexamined Patent Application Publication No. 63-70326

In position detecting apparatuses disclosed in Patent Documents 1 to 3, a position pointer has a resonant circuit. A characteristic of the resonant circuit is controlled in synchronization with an electromagnetic wave transmitted from a tablet, depending on a status of a switch of the position pointer or depending on data indicating a pointer pressure against the tablet or the like transmitted from the position pointer. In those techniques disclosed in Patent Documents 1 to 3, the position pointer does not have a battery. The electric power with which the position pointer operates is obtained by rectifying a signal induced by the electromagnetic wave transmitted from the tablet.

When a position detecting apparatus of this type is used with a battery-powered portable personal computer, the electric, power of the position detecting apparatus is acquired from an electromagnetic wave transmitted from the portable personal computer. In some cases, a position detecting apparatus is disposed on a personal computer to realize a capability of inputting data via a liquid crystal screen using a pen. In these position detecting apparatuses, in order for a position pointer to acquire sufficient electric power, a tablet has to transmit an electromagnetic wave with sufficiently large power, which causes a reduction in life of a battery of a portable personal computer.

To solve the above-described problem, Patent Document 4 disclose's a technique to reduce electric power consumed by a tablet by disposing a battery in a position pointer whereby the position pointer operates with electric power supplied from the battery. It is also known to dispose a battery and an oscillator in a position pointer whereby a high-frequency signal generated by the oscillator is radiated in the form of an electromagnetic wave from the position pointer, and a tablet detects a position pointed to by the position pointer by detecting the electromagnetic wave.

Patent Document 5 discloses a technique using electrostatic coupling. In this technique, a battery and an oscillator are disposed in a position pointer, and a high-frequency electric field generated by the position pointer is detected by a tablet.

In the technique in which a battery is disposed in a position pointer, a power switch disposed on the position pointer is turned off when the position pointer is not used. However, a manual operation to turn on/off the power switch is troublesome for a user.

In some position pointers, there is no power switch, and power is automatically turned off to reduce useless consumption of electric power of a battery when no operation (pressing of a button, pressing the position pointer against a tablet, or the like) is performed with the position pointer in a predetermined period. However, the period is set to be long enough to allow the position pointer to be used in a convenient way, and thus wasting of electric power of the battery occurs.

SUMMARY OF THE INVENTION

In view of the above, it is an object of the present invention to provide a position detecting apparatus in which electric power of a position pointer is turned on only when a position pointer is put within a particular range from a tablet, thereby minimizing consumption of a battery disposed in the position pointer. It is another object of the present invention to provide a position pointer suitable for use in such a position detecting apparatus.

In an aspect, the present invention provides a position detecting apparatus comprising a tablet and a position pointer, wherein the tablet comprises a control signal transmission means for transmitting a control signal to the position pointer to start an operation of the position pointer, and a detection means for detecting a position pointed to by the position pointer, based on a signal transmitted from the position pointer. The position pointer comprises a battery for supplying electric power to circuit elements of the position pointer, a control signal detection means for detecting the control signal transmitted from the tablet, and a power control means for turning on or off the electric power supplied from the battery to the circuit elements in accordance with the control signal detected by the control signal detection means.

In the tablet, the control signal transmission means transmits the control signal to the position pointer to start the operation of the position pointer. The detection means detects a position pointed to by the position pointer, based on the signal transmitted from the position pointer. In the position pointer, the control signal detection means detects the control signal transmitted from the tablet. The power control means turns on or off the electric power supplied from the battery to the circuit elements of the position pointer to allow the position pointer to operate in accordance with the control signal detected by the control signal detection means.

In another aspect, the present invention provides a position detecting apparatus for detecting a position on a tablet pointed to by a position pointer by transmitting and receiving a signal using electrostatic induction between the tablet and the position pointer. The tablet comprises a control signal transmission means for transmitting a control signal to the position pointer to start an operation of the position pointer when the position pointer is put within a predetermined range from a tablet surface. The position pointer comprises a battery serving as a power supply with which to operate the position pointer, a control signal detection means for detecting the control signal transmitted from the tablet, and a power control means for turning on or off the electric power supplied from the battery in accordance with the control signal detected by the control signal detection means.

In another aspect, the present invention provides a position detecting apparatus comprising a tablet and a position pointer. The tablet is adapted to detect a position pointed to by the position pointer by transmitting an electromagnetic wave capable of causing the position pointer to have an induced voltage including timing information. The tablet also detects a position pointed to by the position detector by detecting a phase or an amplitude of an electromagnetic wave returned from the position pointer with particular timing based on the timing information. The position pointer includes at least a resonant circuit including a coil and a capacitor and is adapted to thereby receive the electromagnetic wave radiated from the tablet and control a resonant characteristic of the resonant circuit with the timing based on the timing information. The position pointer comprises a battery serving as a power supply with which to operate the position pointer, an electromagnetic wave detection means for detecting the electromagnetic wave transmitted from the tablet, and a power control means for turning on or off the electric power supplied from the battery in accordance with a result of a detection made by the electromagnetic wave detection means.

The power control means may turn on the electric power supplied from the battery when a signal level detected by the electromagnetic wave detection means is equal to or higher than a threshold value. The power control means may turn off the electric power supplied from the battery when the signal level is lower than the threshold value.

In another aspect, the present invention provides a position pointer for pointing to a position on a tablet by using electromagnetic induction or electrostatic induction between the position pointer and the tablet. The position pointer comprises a battery for supplying electric power to circuit elements of the position pointer, a control signal detection means for detecting a control signal transmitted from the tablet, and a power control means for turning on or off the electric power supplied from the battery to the circuit elements in accordance with the control signal detected by the control signal detection means. In this position pointer, the control signal detection means detects the control signal transmitted from the tablet. The power control means turns on or off the electric power supplied from the battery to the circuit elements in accordance with the control signal detected by the control signal detection means.

In another aspect, the present invention provides a position pointer for pointing to a position on a tablet by using electromagnetic induction or electrostatic induction between the position pointer and the tablet. The position pointer comprises a battery serving as a power supply with which to operate the position pointer, a signal detection means for detecting a signal transmitted from the tablet, and a power control means for turning on/off electric power supplied from the battery in accordance with the signal detected by the signal detection means. In this position pointer, the signal detection means detects the signal transmitted from the tablet, and the power control means turns on or off the electric power supplied from the battery in accordance with the signal detected by the signal detection means.

In an aspect, the present invention provides a position pointer comprising at least a resonant circuit including a coil and a capacitor. The position pointer is adapted to thereby receive an electromagnetic wave radiated from a tablet with particular timing, control a resonant characteristic of the resonant circuit with the particular timing, and point to a position on the tablet by using electromagnetic induction or electrostatic induction between the position pointer and the tablet. The position pointer further comprises a battery, an electromagnetic wave detection means for detecting the electromagnetic wave transmitted from the tablet, and a power control means for turning on or off the electric power supplied from the battery in accordance with a result of a detection made by the electromagnetic wave detection means.

In this position pointer, the power control means may turn on the electric power supplied from the battery when a signal level detected by the electromagnetic wave detection means is equal to or higher than a threshold value. The power control means may turn off the electric power supplied from the battery when the signal level is lower than the threshold value.

According to the present invention, the electric power of the position pointer is turned on only when the position pointer is put within the particular range from the tablet. Thus, the position detecting apparatus and the position pointer according to the present invention minimizes the wasting of the electrical power of the battery.

Furthermore, in the present invention, it is not necessary to acquire electric power with which to operate the position pointer from an electromagnetic wave transmitted from the tablet, and thus the tablet consumes less electric power.

DESCRIPTION OF THE PREFERRED EMBODIMENT(S)

Figure 1:
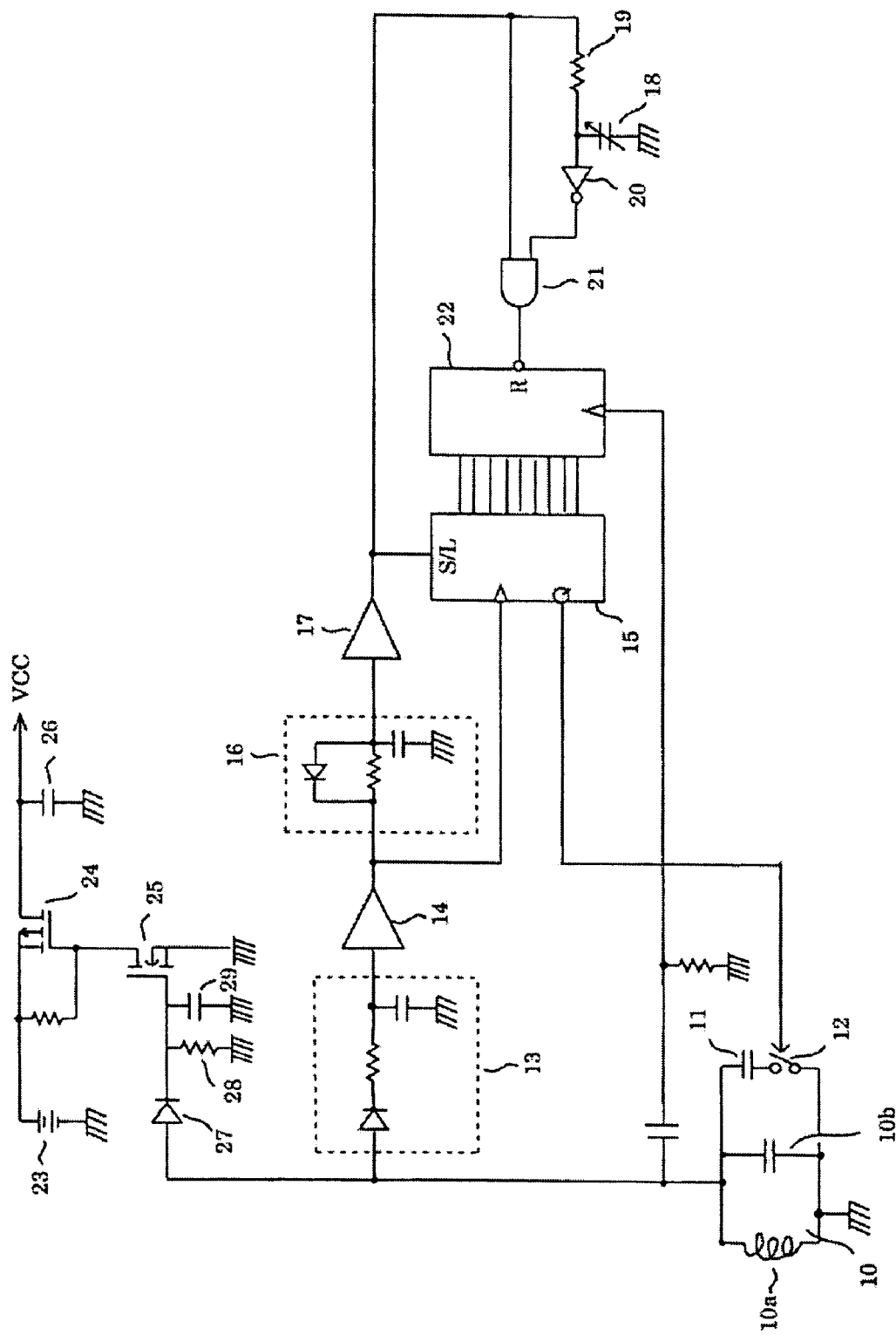
FIG. 1 is a block diagram of a position pointer according to an embodiment of the present invention.

First, an overview of a position detecting apparatus and a position pointer according to an embodiment of the present invention is provided. When the position pointer is put within a particular range from a tablet surface (for example, when the position pointer is put on the tablet surface), a control signal transmission means disposed in the tablet transmits a control signal to the position pointer to start the operation of the position pointer. The position pointer includes a battery, control signal detection means for detecting the control signal transmitted from the tablet, and power control means for turning on or off the electric power supplied from the battery to the circuit elements of the position pointer in accordance with the control signal detected by the control signal detection means.

The tablet determines a position pointed to by the position pointer by transmitting and receiving an electromagnetic wave carrying information including timing information. Based on a phase or amplitude of the electromagnetic wave returned from the position pointer with the predetermined timing, the tablet detects information associated with an operation performed on the position pointer or other information specific to the position pointer. The position pointer includes a resonant circuit including a coil and a capacitor and is adapted to thereby receive the electromagnetic wave radiated from the tablet and control a resonant characteristic of the resonant circuit with the particular timing. The position pointer also includes a battery serving as a power supply with which to operate the position pointer, an electromagnetic wave detection means for detecting an electromagnetic wave transmitted from the tablet, and a power control means for turning on or off the electric power supplied from the battery in accordance with a result of a detection made by the electromagnetic wave detection means.

The power control means turns on the electric power supplied from the battery when a signal level detected by the electromagnetic wave detection means is equal to or higher than a threshold value. The power control means turns off the electric power supplied from the battery when the signal level is lower than the threshold value.

With reference to the drawings, the position detecting apparatus and the position pointer used in the position detecting apparatus are described in further detail below.

In a position detecting apparatus according to a first embodiment of the present invention, a tablet is adapted to detect a position pointed to by a position pointer by transmitting an electromagnetic wave capable of causing the position pointer to have an induced voltage including timing information and by detecting a phase or an amplitude of an electromagnetic wave returned from the position pointer with particular timing based on the timing information. The position pointer includes at least the resonant circuit including the coil and the capacitor and is adapted to thereby receive the electromagnetic wave radiated from the tablet and control a resonant characteristic of the resonant circuit with the timing based on the timing information. Data indicating an on/off-state of a switch of the position pointer or indicating an indicator pressure against the tablet or the like is represented by a change in phase or amplitude with respect to particular reference timing and transmitted from the position pointer to the tablet. In the tablet, based on the change in phase or amplitude of the received electromagnetic wave relative to the reference timing, information indicating the on/off state of the position pointer or the pointer pressure is detected. In the first embodiment, the detection of the status of the switch or the pointer pressure of the position pointer may be performed using a known technique (for example, a technique disclosed in one of Patent Documents 1, 2, and 10).

In the first embodiment of the present invention, the position pointer used in the position detecting apparatus comprises at least a resonant circuit including a coil and a capacitor. The position pointer is adapted to thereby receive an electromagnetic wave radiated from a tablet with particular timing, control a resonant characteristic of the resonant circuit with the particular timing, and point to a position on the tablet by using electromagnetic induction or electrostatic induction between the position pointer and the tablet. FIG. 1 is a block diagram showing a configuration of the position pointer of the position detecting apparatus according to the first embodiment of the invention. In the example shown in FIG. 1, the position pointer is configured to detect a pointer pressure, convert the detected pointer pressure into a digital signal of 0 or 1, and change the phase of the signal to be returned to the tablet depending on whether the digital pointer pressure signal is 0 or 1. In FIG. 1, a coil 10$a$ and a capacitor 10$b$ form a resonant circuit 10. A series of a switch 12 and a capacitor 11 with much smaller capacitance than that of the capacitor 10$b$ is connected to the resonant circuit 10 such that the resonant frequency of the resonant circuit 10 slightly changes when the switch 12 is turned on/off.

A detector 13 detects timing information associated with transmission/reception from a signal generated by the resonant circuit 10. An output terminal of the detector 13 is connected to a comparator 14, which extracts a clock signal corresponding to transmission/reception of the electromagnetic wave from/to the tablet. The extracted clock signal is applied to a clock input terminal of a parallel-to-serial converter 15. The output of the comparator 14 is also connected to an integrator 16. The integrator outputs a voltage only when a signal is received from the tablet continuously over a period with a length equal to or longer than a predetermined value. The waveform of the voltage output from the integrator 16 is shaped by a comparator 17.

A capacitor 18 and a resistor 19 form an integrator. The capacitance of the capacitor 18 varies depending on the pointer pressure against the tablet. An input terminal of the integrator is connected to the output terminal of the comparator 17, and an output terminal of the integrator is connected to an inverter 20. An output terminal of the inverter 20 is connected to an input terminal of an AND gate 21. A signal output from the comparator 17 is applied to the other input terminal of the AND gate 21. A counter 22 counts the number of waves of a high-frequency signal generated by the resonant circuit 10 during a period in which the signal output from the AND gate 21 is at a high level. The counter 22 outputs 8-bit digital data indicating the resultant counted number.

The 8-bit data output from the counter 22 is supplied to the parallel-to-serial converter 15, which sequentially converts the received data in synchronization with a clock signal that corresponds to the transmission/reception and that is Supplied from the comparator 14. A signal output from the parallel-to-serial converter 15 is supplied to a control terminal of the switch 12 to slightly change the resonant frequency of the resonant circuit 10. The digital signal generated by the resonant circuit 10 is output from the position pointer to the tablet. Thus, the digital signal output to the tablet varies in phase depending on the pointer pressure thereby representing the pointer pressure.

A P-channel MOSFET 24 and a N-channel MOSFET 25 are connected to a battery 23 serving as a power supply for driving circuit elements of the position pointer. The P-channel MOSFET 24 and the N-channel MOSFET 25 serve as a switch to turn on/off electric power from the battery 23 to the circuit elements of the position pointer. A capacitor 26 serves to maintain the power supply voltage at a constant value. The signal generated by the resonant circuit 10 is detected by a circuit composed of a diode 27, a resistor 28, and a capacitor 29, and the MOSFET 25 is turned on or off depending on a detection result.

The resonant circuit 10 serves as control signal detection means for detecting a control signal transmitted from the tablet, an electromagnetic wave detection means for detecting an electromagnetic wave transmitted from the tablet, or a signal detection means for detecting a signal transmitted from the tablet. A circuit composed of the P-channel MOSFET 24, the N-channel MOSFET 25, the capacitors 26 and 29, the diode 27 and the resistor 28 serves as power control means for turning on or off the electric power supplied from the battery 23 to circuit elements of the position pointer. Power is turned on and off in accordance with a control signal detected by the resonant circuit 10 serving as the control signal detection means, an electromagnetic wave detected by the resonant circuit 10 serving as the electromagnetic wave detection means, or a signal detected by the resonant circuit 10 serving as the signal detection means.

Figure 2:
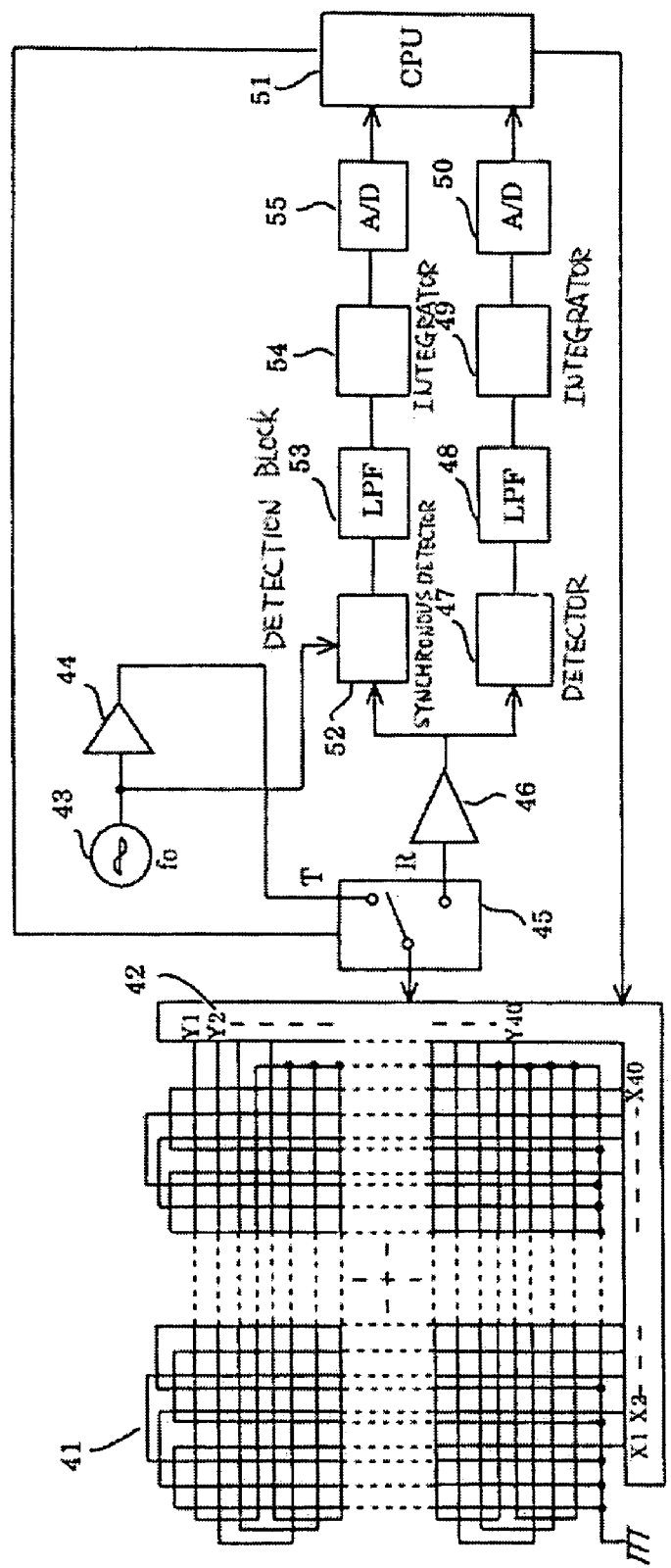
FIG. 2 is a block diagram of a tablet used in a position detecting apparatus according to an embodiment of the present invention.

FIG. 2 is a block diagram showing a configuration of the tablet of the position detecting apparatus according to the first embodiment of the present invention.

In FIG. 2, a loop coil set (loop sensor set) 41 serving as sensor means is disposed such that loop coils X1 to X40 are arranged in an X direction and loop coils Y1 to Y2 are arranged in a Y direction. The loop coils X1 to X40 and Y1 to Y40 are connected to a selector 42 for selecting a loop coil.

An oscillator 43 oscillates at a frequency of fo equal to the resonant frequency of the resonant circuit 10 of the position pointer. The oscillator 43 is connected to a transmission terminal (T) of a duplexer 45 via a current driver 44. The selector 42 is connected to a common terminal of the duplexer 45 such that an electromagnetic wave with a frequency of fo is radiated from a selected loop coil to the position pointer.

A reception terminal (R) of the duplexer 45 is connected to an amplifier 46 that is connected to a detector circuit 47. The detector circuit 47 is connected to a lowpass filter 48. The lowpass filter 48 is connected to an integrating amplifier 49 that stores a received signal for a predetermined period. An analog voltage stored by the integrating amplifier 49 is converted into a digital signal by an analog-to-digital converter 50. The digital signal output from the analog-to-digital converter 50 is supplied to a central processing unit (CPU) 51.

A synchronous detector 52 is connected to the amplifier 46. The oscillator 43 supplies a clock signal to the synchronous detector 52. The clock signal is used as a reference signal by the synchronous detector 52 to detect the phase. The synchronous detector 52 is connected to a lowpass filter 53. The lowpass filter 53 is connected to an integrating amplifier 54 that stores a received signal for a predetermined period. An analog voltage stored by the integrating amplifier 54 is converted into a digital signal by an analog-to-digital converter 55. The digital signal output from the analog-to-digital converter 55 is supplied to the CPU 51. The CPU 51 supplies a control signal to the selector 42 to select a particular loop coil from the loop coil set 41. The CPU 51 also supplies a control signal to the duplexer 45 to control switching between transmission and reception.

A circuit composed of the loop coil set 41, the selector 42, the oscillator 43, the current driver 44, the duplexer 45, and the CPU 51 serves as control signal transmission means for transmitting a control signal. The circuit also serves as an electromagnetic wave transmission means for transmitting an electromagnetic wave, or signal transmission means for transmitting a signal. A combination of the loop coil set 41, the selector 42 and circuit elements 45 to 51 forms a detection means for detecting a position pointed to by the position pointer.

The position detecting apparatus constructed in the above-described manner operates as described below. The operation of the tablet shown in FIG. 2 is known (as is disclosed, for example, in Patent Documents 6, 7, and 8), and thus a detailed description thereof is not given herein. The operation of the circuit elements 10 to 22 shown in FIG. 1 to detect a pointer pressure and transmit a signal indicating the detected pointer pressure is also known (for example, as is disclosed in Patent Documents 2, 9, and 10), and thus a detailed description thereof is not given herein. The circuit elements 23 to 29 shown in FIG. 1 are the primary parts that characterize the first embodiment of the present invention, and thus the following explanation will be focused on the operation of these circuit elements 23 to 29.

First, the operation of the position pointer shown in FIG. 1 and the operation of the tablet shown in FIG. 2 are briefly described. In a mode (position detection mode) in which a position pointed to by the position pointer is detected by the tablet, the CPU 51 switches the duplexer 45 between a transmission mode and a reception mode at predetermined time intervals. In the transmission mode, a signal generated by the oscillator 43 is supplied to a loop coil selected by the selector 42, and a signal for detection is transmitted in the form of an electromagnetic wave to the position pointer. If the position pointer receives the electromagnetic wave via the resonant circuit 10, the position pointer returns an electromagnetic wave from the resonant circuit 10.

The electromagnetic wave returned from the position pointer is detected by the tablet when the tablet is in the reception mode. The operation described above is performed a predetermined number of times for each loop coil. The operation is performed for all loop coils when the position of the position pointer cannot be predicted. When a current position of the position pointer can be predicted from an immediately previous position, the operation may be performed for only a particular number of loop coils in the vicinity of the previous position. Based on the signals detected by the respective loop coils, the CPU 51 calculates the position pointed to by the position pointer.

The operation of detecting the pointer pressure is described below. First, in a burst mode, a signal (burst signal) with a predetermined length is transmitted from the tablet to the position pointer. In a pointer pressure detection mode following the burst mode, the position pointer slightly changes the resonant frequency of the resonant circuit 10 by turning on or off the switch 12 depending on the capacitance of the capacitor 18 varying with pointer pressure. Thus, the digital signal generated by the resonant circuit 10 varies in phase depending on the pointer pressure. That is, the digital signal represents the pointer pressure. This digital signal is transmitted to the tablet. In the above operation, the position pointer changes the resonant frequency of the resonant circuit 10 with particular timing based on timing information included in the signal received from the tablet. The signal generated by the resonant circuit 10 is transmitted in the form of an electromagnetic wave to the tablet. With the particular timing based on the timing information, the tablet detects the phase of the electromagnetic wave returned from the position pointer thereby detecting the pointer pressure.

The operation of controlling the power supply of the position pointer according to the first embodiment of the present invention will now be described.

Figure 3:
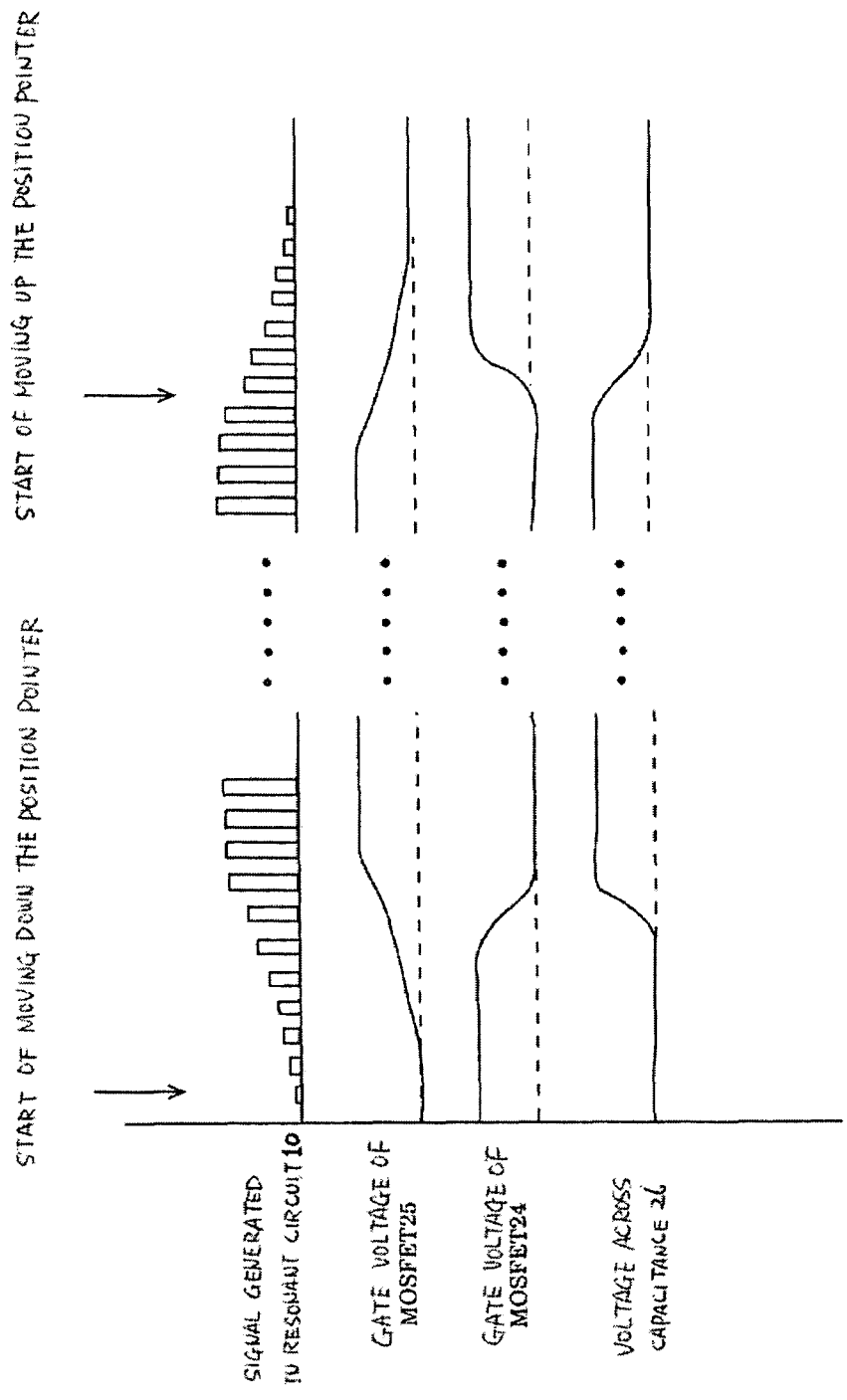
FIG. 3 is a timing chart associated with an operation of a position detecting apparatus according to an embodiment of the present invention.

FIG. 3 is a timing chart associated with the operation of the position detecting apparatus according to the first embodiment of the present invention. The operation starts with moving down the position pointer shown in FIG. 1 to the tablet also shown in FIG. 1, and ends with moving the position pointer away from the tablet.

Referring to FIGS. 1 to 3, the operation of the position detecting apparatus according to the present embodiment and, in particular, the operation of the position pointer are described in further detail.

When the position pointer is not located on the tablet, no signal is generated in the resonant circuit 10, and thus the MOSFET 25 and the MOSFET 24 are both in the off-state. Therefore, no voltage is supplied from the battery 23 to the capacitor 26 and no electric power is supplied to circuit elements of the position pointer. In this state, no current flows out of the battery 23, and no electrical power consumption occurs in the battery 23.

In this state, if the position pointer is moved down to the tablet (that is, if a pen-down operation occurs), the control signal for controlling the power supply transmitted from the tablet is received by the resonant circuit 10 and a signal is generated in the resonant circuit 10. Note that in the present embodiment, the electromagnetic signal for use for position detection is also used as the control signal for controlling the power supply. As shown in FIG. 3, as the position pointer approaches the tablet, the amplitude of the signal generated in the resonant circuit 10 increases. Accordingly the gate voltage of the MOSFET 25 increases, and the MOSFET 25 eventually turns on.

When the MOSFET 25 turns on, the gate voltage of the MOSFET 24 falls down and the MOSFET 24 also turns on. As a result, supplying of electric power to circuit elements of the position pointer is started.

Conversely, if the position pointer is moved away from the tablet surface (that is, if a pen-up operation occurs), the amplitude of the signal supplied from the resonant circuit 10 decreases as shown in FIG. 3, and the MOSFET 25 and the MOSFET 24 turn off.

In the first embodiment, as described above, the power of the position pointer (the power supplied from the battery 23 to circuit elements of the position pointer) is turned off each time the position pointer is moved away from the tablet surface. This prevents the battery 23 disposed in the position pointer from wasting electric power and thus allows the batter 23 to have a longer life. Another advantage of the first embodiment is that it is not necessary for the position pointer to acquire electric power for operation from the electromagnetic wave transmitted from the tablet, and thus it is possible to reduce the power of the electromagnetic wave transmitted from the tablet to a very low level.

Although in this first embodiment, the phase of the signal returned from the position pointer is changed depending on information returned from the position pointer, the signal level or other parameters may be changed. Information other than the pointer pressure may be returned from the position pointer.

As for the battery 23, various types of batteries such as a manganese dry battery, a mercury cell, or a lithium battery may be used. A rechargeable battery such as a nickel-cadmium battery may also be used. In this case, the low power consumption achieved in the present embodiment allows the rechargeable battery to be used for a longer period for each charging than can be used in the conventional techniques.

A position detecting apparatus according to a second embodiment of the present invention will now be described.

Figure 4:
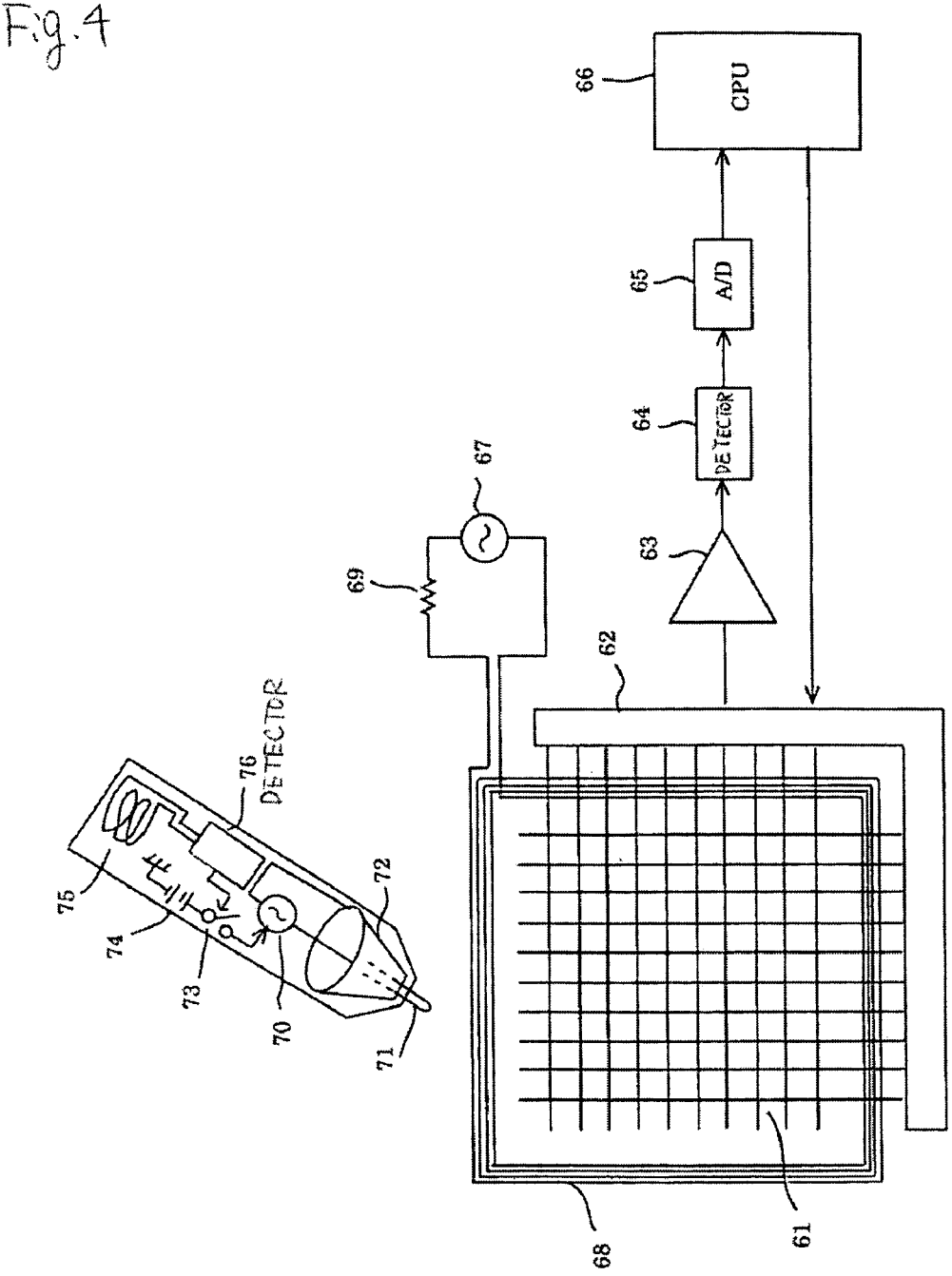
FIG. 4 is a block diagram of a position detecting apparatus according to an embodiment of the present invention.

FIG. 4 is a block diagram showing a configuration of a position pointer of the position detecting apparatus according to the second embodiment of the invention. In this second embodiment, a position pointed to by the position pointer is detected using electrostatic coupling.

In FIG. 4, sense lines (linear sensors) 61 serving as sensor means for detecting a high-frequency electric field radiated from a position pointer (that will be described in detail later) are disposed such that they extend in both vertical and horizontal directions and such that they are equally spaced. The sense lines 61 are connected to a selector 62 that selects one or two or more adjacent lines from the sense lines 61.

The one or more sense lines selected by the selector 62 are connected to an amplifier 63. An output of the amplifier 63 is connected to a detector 64. An output of the detector 64 is connected to an analog-to-digital converter 65. An output of the analog-to-digital converter 65 is connected to a central processing unit (CPU) 66. The CPU 66 supplies a switching signal to the selector 62. An oscillator 67 is connected via a current-limiting resistor 69 to a loop coil 68 disposed around the sense lines 61.

Circuit elements 61 to 66 form a tablet. The sense lines 61, the selector 62, the amplifier 63, the detector 64, the analog-to-digital converter 65, and the CPU 66 form detection means for detecting a position pointed to by the position pointer. A circuit composed of the oscillator 67, the loop coil 68, and the resistor 69 serves as control signal transmission means for transmitting a control signal. The circuit also serves as an electromagnetic wave transmission means for transmitting an electromagnetic wave, or signal transmission means for transmitting a signal.

An oscillator 70 is connected between two electrodes 71 and 72. Electric power is supplied from a battery 74 to the oscillator 70 and other circuit elements via a switch 73. Reference numerals 75 and 76 respectively denote a coil and a detector. The circuit elements 70 to 76 described above form the position pointer. The switch 73 and the detector 76 form power control means. The coil 75 serves as control signal detection means for detecting a control signal transmitted from the tablet. The coil also serves as an electromagnetic wave detection means for detecting an electromagnetic wave transmitted from the tablet, or signal detection means for detecting a signal transmitted form the tablet.

The operation of the position detecting apparatus according to the second embodiment of the present invention will now be described. If the position pointer is put on the tablet, a voltage is induced in the coil 75 in the position pointer by a control signal radiated in the form of an electromagnetic wave from the loop coil 68. The voltage induced in the coil 75 is used as power that allows the detector 76 to operate. If the detector 76 detects the induced voltage, the detector 76 turns on the switch 73. As a result, electric power is supplied from the battery 74 to the oscillator 70. If the electric power is supplied to the oscillator 70, a high-frequency electric field is generated between the electrodes 71 and 72.

The tablet detects the high-frequency electric field generated by the position pointer by selectively switching the lines of the sense lines 61. More specifically, in the tablet, the CPU 66 sequentially selects sense lines via the selector 62, and the CPU 66 determines the position pointed to by the position pointer based on the distribution of the high-frequency electric field detected by all sense lines (or a particular number of sense lines).

If the position pointer is moved away from the tablet surface, no voltage is generated in the coil 75 of the position pointer. As a result, no signal is output from the detector 76, and the switch 73 turns off. Thus, the oscillator 70 stops operation. In this state, no current flows out of the battery 74.

In the second embodiment, as described above, the power of the position pointer is turned off each time the position pointer is moved away from the tablet surface by a distance equal to or greater than a threshold value. That is, the power control means turns on the electric power supplied from the battery 74 when the signal level of the control signal detected by the electromagnetic wave detection means exceeds a threshold value. The power control means turns off the electric power supplied from the battery 74 when the signal level of the control signal becomes lower than the threshold value.

Thus, the battery 74 disposed in the position pointer does not waste electric power and has a long life. Furthermore, in this second embodiment, the power of the electromagnetic wave radiated from the loop coil 68 is sufficient so that the signal detected by the coil 75 can drive the switch 73, and thus output power of the oscillator can be set to be very low.

Although in the second embodiment, the position pointed to by the position pointer is detected by means of electrostatic induction, the detection may also be made by means of electromagnetic induction by replacing the electrodes 71 and 72 shown in FIG. 4 with a coil, and replacing the sense lines of the tablet with loop coils.

The loop coil 75 used to detect a signal transmitted from the tablet may also be used in a resonant circuit that resonates at the same frequency as the frequency of the oscillator 67. As for the battery 74, as in the first embodiment described earlier, a manganese dry battery, a mercury cell, or a lithium battery may be used. A rechargeable battery such as a nickel-cadmium battery may also be used. In this case, the low power consumption achieved in the present embodiment allows the rechargeable battery to be used for a longer period for each charging than can be used in the conventional techniques.

As described above, a position detecting apparatus according to an embodiment of the present invention comprises a tablet and a position pointer. The tablet comprises a control signal transmission means for transmitting a control signal to the position pointer to start the operation of the position pointer, and a detection means for detecting a position pointed to by the position pointer, based on a signal transmitted from the position pointer. The position pointer comprises a battery for supplying electric power to circuit elements of the position pointer thereby allowing the position pointer to operate. The position pointer also comprises a control signal detection means for detecting the control signal transmitted from the tablet, and power control means for turning on or off the electric power supplied from the battery to the circuit elements in accordance with the control signal detected by the control signal detection means. As for the control signal, the signal for position detection, a power control signal for controlling the power of the position pointer, or other signals may be used. When the signal transmission/reception between the position pointer and the tablet is performed by means of electromagnetic coupling, the signal is transmitted in the form of an electromagnetic wave. When the signal transmission/reception is performed by means of electrostatic coupling, the signal is transmitted in the form of a radio wave.

In an embodiment of the present invention, a position detecting apparatus detects a position on a tablet pointed to by a position pointer by transmitting and receiving a signal using electrostatic induction between the tablet and the position pointer. The tablet includes a control signal transmission means disposed in the tablet that transmits a control signal to the position pointer to start the operation of the position pointer. The position pointer includes a battery serving as a power supply with which to operate the position pointer, a control signal detection means for detecting the control signal transmitted from the tablet, and a power control means for turning on or off electric power supplied from the battery in accordance with the control signal detected by the control signal detection means.

A position detecting apparatus according to an embodiment of the present invention comprises a tablet being adapted to detect a position pointed to by a position pointer. The tablet transmits an electromagnetic wave capable of causing the position pointer to have an induced voltage including timing information. The tablet also detects the phase or an amplitude of an electromagnetic wave returned from the position pointer with particular timing based on the timing information. The position detecting apparatus also includes position pointer that has at least a resonant circuit which includes a coil and a capacitor. The position pointer is adapted to thereby receive the electromagnetic wave radiated from the tablet and control a resonant characteristic of the resonant circuit with the timing based on the timing information. The position pointer includes a battery serving as a power supply with which to operate the position pointer, an electromagnetic wave detection means for detecting the electromagnetic wave transmitted from the tablet, and a power control means for turning on or off the electric power supplied from the battery in accordance with a result of a detection made by the electromagnetic wave detection means.

In the position detecting apparatus according to this embodiment, as described above, the power of the position pointer is turned on only when the position pointer is put within the particular range from the tablet. Therefore, in the position detecting apparatus according to the present embodiment, the consumption of the battery disposed in the position pointer is minimized.

The power control means may turn on the electric power supplied from the battery when the signal level detected by the electromagnetic wave detection means is equal to or higher than a threshold value. The power control means turns off the electric power supplied from the battery when the signal level is lower than the threshold value.

In an embodiment of the present invention, a position pointer points to a position on a tablet by using electromagnetic induction or electrostatic induction between the position pointer and the tablet. The position pointer comprises a battery for supplying electric power to circuit elements of the position pointer, a control signal detection means for detecting a control signal transmitted from the tablet, and a power control means for turning on or off the electric power supplied from the battery to the circuit elements in accordance with the control signal detected by the control signal detection means.

In an embodiment of the present invention, a position pointer points to, at least, a position on a tablet by using electromagnetic induction or electrostatic induction between the position pointer and the tablet. The position pointer comprises a battery serving as a power supply with which to operate the position pointer, a signal detection means for detecting a signal transmitted from the tablet, and a power control means for turning on/off electric power supplied from the battery in accordance with the signal detected by the signal detection means.

In an embodiment of the present invention, a position pointer receives an electromagnetic wave or a radio wave radiated with particular timing from a tablet, controls a resonant characteristic of the resonant circuit with the particular timing, and points to a position on the tablet by using electromagnetic induction or electrostatic induction between the position pointer and the tablet. The position pointer comprises a battery; an electromagnetic wave detection means for detecting the electromagnetic wave transmitted from the tablet, and a power control means for turning on or off the electric power supplied from the battery in accordance with a result of a detection made by the electromagnetic wave detection means.

In the position pointer according to this embodiment, the power of the position pointer is turned on only when the position pointer is put within a particular range from the tablet, and thus the consumption of the battery disposed in the position pointer is minimized.

In the embodiments described above, electric power from a battery disposed in a position pointer is turned on when the position pointer is put on the upper surface of a tablet and the operation of the position pointer is started. Alternatively, electric power may be turned on and the operation may be started when the position pointer is put within a particular area on the upper surface of the tablet.

In the embodiments described above, a signal used to detect a position pointed to by a position pointer is also used as a control signal for turning on or off a battery disposed in the position pointer. This allows simplification in configuration of a position detecting apparatus. Alternatively, a dedicated control signal including an identification code identifiable by the position pointer may be used as the control signal. This makes it possible for the position pointer to correctly operate even when there is high-level noise.

In the embodiments described above, information indicating a pointer pressure or a status of a switch is transmitted by means of modulating a phase (or a frequency). Alternative, information may be transmitted by means of modulating a signal level.

The present invention is applicable to a position detecting apparatus for detecting at least a position of a position pointer and also applicable to a position pointer for use in such a position detecting apparatus. More specifically, the present invention is applicable to a position detecting apparatus for detecting a position pointed to by a position pointer by means of magnetic coupling or electric field coupling, for use as an input device, for example, in a CAD (Computer Aided Design) system, a computer, a portable telephone, a PHS (Personal Handyphone System) telephone, or the like, and is also applicable to a position pointer for use in such a position detecting apparatus. The present invention is also applicable to a position detecting apparatus for detecting not only a position of a position pointer but also other parameters such as an attitude of the position pointer.

What we claim is:

1. A position detecting apparatus comprising a tablet and a position pointer, the tablet comprising:
   control signal transmission means for transmitting a control signal to the position pointer to start an operation of the position pointer; and
   detection means for detecting a position pointed to by the position pointer, based on a signal transmitted from the position pointer, and
   the position pointer comprising:
   a battery for supplying electric power to circuit elements of the position pointer;
   control signal detection means for detecting the control signal transmitted from the tablet; and
   power control means for turning on or off the electric power supplied from the battery to the circuit elements in accordance with the control signal detected by the control signal detection means,
   wherein the power control means turns on the electric power supplied from the battery when a signal level detected by the control signal detection means is equal to or higher than a threshold value and the power control means turns off the electric power supplied from the battery when the signal level is lower than the threshold value.

2. A position detecting apparatus according to claim 1, wherein the power control means disconnects the battery from the circuit elements and the control signal detection means when the signal level is lower than the threshold value.

3. A position detecting apparatus comprising a tablet and a position pointer, the tablet being adapted to detect a position pointed to by the position pointer by transmitting an electromagnetic wave capable of causing the position pointer to have an induced voltage including timing information and by detecting a phase or an amplitude of an electromagnetic wave returned from the position pointer with particular timing based on the timing information, the position pointer including at least a resonant circuit including a coil and a capacitor and being adapted to thereby receive the electromagnetic wave radiated from the tablet and control a resonant characteristic of the resonant circuit with the timing based on the timing information,
   the position pointer comprising:
   a battery serving as a power supply with which to operate the position pointer;
   electromagnetic wave detection means for detecting the electromagnetic wave transmitted from the tablet; and
   power control means for turning on or off the electric power supplied from the battery in accordance with a result of a detection made by the electromagnetic wave detection means.

4. A position detecting apparatus according to claim 3, wherein the power control means turns on the electric power supplied from the battery when a signal level detected by the electromagnetic wave detection means is equal to or higher than a threshold value and the power control means turns off the electric power supplied from the battery when the signal level is lower than the threshold value.

5. A position detecting apparatus according to claim 3, wherein the power control means disconnects the battery from other elements of the position pointer when a signal level of the electromagnetic wave is lower than a threshold value.

6. A position pointer for pointing to a position on a tablet by using electromagnetic induction or electrostatic induction between the position pointer and the tablet, the position pointer comprising:
   a battery for supplying electric power to circuit elements of the position pointer;
   control signal detection means for detecting a control signal transmitted from the tablet; and
   power control means for turning on or off the electric power supplied from the battery to the circuit elements in accordance with the control signal detected by the control signal detection means.

7. A position pointer according to claim 6, wherein the power control means turns on the electric power supplied from the battery when a signal level detected by the control signal detection means is equal to or higher than a threshold value and the power control means turns off the electric power supplied from the battery when the signal level is lower than the threshold value.

8. A position pointer according to claim 6, wherein the power control means disconnects the battery from the circuit elements and the control signal detection means when a signal level detected by the control signal detection means is less than a threshold value and the power control means connects the battery to the circuit elements and the control signal detection means when the signal level is greater than or equal to the threshold value.

9. A position pointer according to claim 6, wherein the power control means comprises at least one switching element for connecting and disconnecting the electric power supplied from the battery to the circuit elements based on a comparison of a signal level of the control signal with a threshold set by inherent characteristics of the at least one switching element.

10. A position pointer for pointing to a position on a tablet by using electromagnetic induction or electrostatic induction between the position pointer and the tablet, the position pointer comprising:

a battery serving as a power supply with which to operate the position pointer;

signal detection means for detecting a signal transmitted from the tablet; and power control means for turning on or off the power supplied from the battery in accordance with the signal detected by the signal detection means.

11. A position pointer according to claim 10, wherein the power control means turns on the power supplied from the battery when a signal level detected by the signal detection means is equal to or higher than a threshold value and the power control means turns off the power supplied from the battery when the signal level is lower than the threshold value.

12. A position pointer according to claim 10, wherein the power control means disconnects the battery when a signal level detected by the signal detection means is less than a threshold value and the power control means connects the battery when the signal level is greater than or equal to the threshold value.

13. A position detecting apparatus comprising a tablet and a position pointer, the tablet comprising:
   a control signal transmitter for transmitting a control signal to the position pointer to start an operation of the position pointer; and
   a detector for detecting a position pointed to by the position pointer, based on a signal transmitted from the position pointer, and the position pointer comprising:
   a battery for supplying electric power to circuit elements of the position pointer;
   a control signal detector for detecting the control signal transmitted from the tablet; and
   a power controller for turning on and off the electric power supplied from the battery to the circuit elements in accordance with the control signal detected by the control signal detector.

14. A position pointer comprising at least a resonant circuit including a coil and a capacitor and being adapted to thereby receive an electromagnetic wave radiated from a tablet with particular timing, control a resonant characteristic of the resonant circuit with the particular timing, and point to a position on the tablet by using electromagnetic induction or electrostatic induction between the position pointer and the tablet, the position pointer further comprising:

a battery;

electromagnetic wave detection means for detecting the electromagnetic wave transmitted from the tablet; and power control means for turning on or off electric power supplied from the battery in accordance with a result of a detection made by the electromagnetic wave detection means.

15. A position pointer according to claim 14, wherein the power control means turns on the electric power supplied from the battery when a signal level detected by the electromagnetic wave detection means is equal to or higher than a threshold value and the power control means turns off the electric power supplied from the battery when the signal level is lower than the threshold value.

16. A position detecting apparatus according to claim 13, wherein the power controller turns on the electric power supplied from the battery when a signal level detected by the control signal detector is equal to or higher than a threshold value and the power controller turns off the electric power supplied from the battery when the signal level is lower than the threshold value.

17. A position detecting apparatus according to claim 13, wherein the power controller comprises a switch for connecting and disconnecting the battery from the circuit elements in accordance with the control signal detected by the control signal detector.

18. A position detecting apparatus according to claim 17, wherein the switch performs a comparison of a signal level of the control signal with a threshold set by inherent characteristics of the switch.

* * * * *